(12) United States Patent
Fickel et al.

(10) Patent No.: US 6,526,760 B2
(45) Date of Patent: Mar. 4, 2003

(54) METHOD AND APPARATUS FOR CONVEYING A CRYOGENICALLY-STORED FUEL

(75) Inventors: Hans Fickel, Moosburg (DE); Juergen Ringler, Kissing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/005,246

(22) Filed: Dec. 7, 2001

(65) Prior Publication Data

US 2002/0069857 A1 Jun. 13, 2002

(30) Foreign Application Priority Data

Dec. 7, 2000 (DE) .......................... 100 60 791

(51) Int. Cl.$^7$ ................................. F25B 9/00
(52) U.S. Cl. ............................. 62/7; 62/50.4
(58) Field of Search ...................... 62/7, 50.4

(56) References Cited

U.S. PATENT DOCUMENTS

| | | | | |
|---|---|---|---|---|
| 4,860,545 A | * | 8/1989 | Zwick et al. ................ | 62/50.6 |
| 4,932,214 A | * | 6/1990 | Nieratscher et al. ......... | 62/50.6 |
| 5,325,894 A | * | 7/1994 | Kooy et al. ................. | 62/50.4 |
| 5,571,231 A | * | 11/1996 | Lee .......................... | 62/50.4 |
| 5,687,776 A | * | 11/1997 | Forgash et al. ............. | 62/50.4 |

FOREIGN PATENT DOCUMENTS

| | | |
|---|---|---|
| DE | 23 29 053 | 12/1973 |
| DE | 33 42 582 C2 | 2/1986 |
| DE | 37 10 363 C1 | 12/1988 |
| DE | 37 41 145 C2 | 7/1990 |
| DE | 39 14 426 C2 | 11/1994 |
| DE | 197 04 360 C1 | 1/1998 |
| DE | 196 45 488 C1 | 6/1998 |

\* cited by examiner

*Primary Examiner*—Ronald Capossela
(74) *Attorney, Agent, or Firm*—Crowell & Moring LLP

(57) ABSTRACT

The invention relates to a method and an apparatus for conveying a cryogenically-stored fuel to an internal-combustion engine for providing a combustible working gas. In accordance with the invention, the cryogenically-stored fuel is drawn, in the liquid state, from a thermally-insulated fuel tank, and forced into a fuel line by a conveying device. At least from time to time, within the scope of the operation of the conveying device, the pressure in the fuel tank is increased by an amount that is larger than the difference between a drop in the supply-flow pressure occurring on the intake side of the conveying device and the difference between the dominant tank pressure at a pump-inlet point and the boiling pressure dictated by the instantaneous fuel temperature.

20 Claims, 1 Drawing Sheet

METHOD AND APPARATUS FOR CONVEYING A CRYOGENICALLY-STORED FUEL

BACKGROUND AND SUMMARY OF THE INVENTION

This application claims the priority of German Application No. 100 60 791.8, filed Dec. 7, 2000, the disclosure of which is expressly incorporated by reference herein.

The invention relates to a method and an apparatus for conveying a cryogenically-stored fuel to an internal-combustion engine for providing a combustible work gas.

Low-boiling fuels, such as hydrogen, can be stored in insulated tank arrangements. The latter, also known as cryo-tanks, are distinguished by a relatively low integral weight, as well as a favorable structural space/storage capacity ratio. The tank arrangements provided for storing the cryogenic fuel, that is, fuel that has been liquefied through the extraction of heat, are typically filled over time with fuel that has been sufficiently supercooled. In tank arrangements for storing hydrogen, fuel temperatures below 20 K are necessary. The fuel can be diverted from the tank in the gaseous state, and conveyed into a mixing system, in which the gaseous fuel is mixed with an oxidation agent, such as the oxygen contained in the ambient air, according to a predetermined stoichiometric ratio. It is also possible to extract the fuel from the tank while the fuel is in liquid form. In this connection, German Patent document DE 696 02 468 T2, for example, describes a cryogenic pump that is distinguished by a low NPSH value, and therefore permits the conveyance of the fuel close to the boiling state. The known cryogenic pumps, however, have a complicated design, and exhibit a reduced conveying power if the fuel has been stored for extended periods of time and the tank fullness level is low.

It is the object of the invention to provide a method and an apparatus for conveying a cryogenically-stored fuel to an internal-combustion engine, the method and apparatus reliably ensuring a sufficient fuel flow from the fuel tank.

In accordance with the invention, this object is accomplished by a method for conveying a cryogenically-stored fuel, in the liquid state, to an internal-combustion engine, with a conveying device conveying the cryogenically-stored fuel from a thermally-insulated fuel tank and into a fuel line, and with the pressure in the fuel tank being increased, at least from time to time, during the operation of the conveying device by an amount that is larger than a dominant intake-pressure gradient on the intake side of the conveying device.

Thus, it is advantageously possible to maintain the fuel in a boiling state for natural cooling until immediately before the motor vehicle is started up. It is further possible to extensively empty the fuel container. The reliable elimination of the risk of cavitation allows for the omission of the pre-conveying devices that have been necessary to this point.

The pressure in the fuel tank is advantageously increased to a level that is higher than the sum of the boiling pressure and the intake-side pressure drop at the conveying device.

In accordance with a particularly preferred embodiment of the invention, the pressure in the fuel tank is increased through the supply of gaseous fuel into the fuel tank. The gaseous fuel is preferably drawn from a pressurized tank and conveyed into the fuel tank.

The gaseous fuel conveyed into the fuel tank can advantageously be diverted from a site in the fuel line that is located downstream of the conveying device, in which instance the diverted fuel is heated and evaporated. The heat supplied to the diverted fuel can preferably be drawn from the environment via a heat exchanger embodied as an evaporator.

In accordance with a particularly preferred embodiment of the invention, the conveying device is driven by a motor that is disposed in the fuel tank and cooled by the fuel. The conveying device preferably conveys the fuel at a pressure level in the range of an internal-combustion intake pressure. Consequently, it is possible to form the combustible working gas in the combustion or work chamber of an internal-combustion engine within the framework of an internal mixture-formation process.

Immediately after the conveying device has been shut off, the pressure in the tank is preferably decreased to the boiling pressure dictated by the fuel temperature. Thus, it is possible to cool the fuel through natural evaporation. This natural evaporation is preferably controlled through the continuous control of the tank pressure. The fuel changing into the gaseous state can be supplied to a secondary consumer, particularly a fuel cell, an auxiliary heating device or an [APU]. It is possible to use the released fuel to operate a cooling system, which additionally cools the tank contents.

With respect to the apparatus, the object mentioned at the outset is accomplished in accordance with the invention by an apparatus for conveying a cryogenically-stored fuel, in the liquid state, to an internal-combustion engine, having a thermally-insulated fuel tank for storing the fuel, a conveying device for conveying the fuel into a fuel line, and a booster device for selectively increasing the pressure in the fuel tank by an amount that is larger than the difference between a drop in the supply-flow pressure occurring on the intake side of the conveying device and the difference between the dominant tank pressure at a pump-inlet point and the boiling pressure dictated by the instantaneous fuel temperature.

It is therefore possible to reliably convey the fuel without the risk that cavitation will impede the conveying capability.

The booster device preferably includes a fuel container for storing the fuel, in the gaseous state, at a pressure level that is higher than the tank pressure. A valve device is preferably provided for controlling the flow of the gaseous fuel into the fuel tank. The valve device can be controlled by a control device, so the dominant tank pressure adheres to a defined control concept.

An evaporator device is preferably provided for supplying heat to a partial fuel flow diverted from the fuel line. A check-valve device can advantageously be disposed in front of this evaporator device for preventing a reflux into the fuel line.

The conveying device is preferably hydrostatic. In this case, high conveying pressures can be attained if the conveying device has a comparatively low power capability. Suitable hydrostatic conveying devices include pistons, gear pumps and/or diaphragm pumps. The valve members provided on the intake side are preferably actuated by drive members, so no considerable pressure drop prevails at these valve members.

The conveying device is preferably disposed in the fuel tank, and includes an electric motor that has a virtually superconducting motor winding.

Other objects, advantages and novel features of the present invention will become apparent from the following detailed description of the invention when considered in conjunction with the accompanying drawings.

DETAILED DESCRIPTION OF THE DRAWINGS

Figure 1:
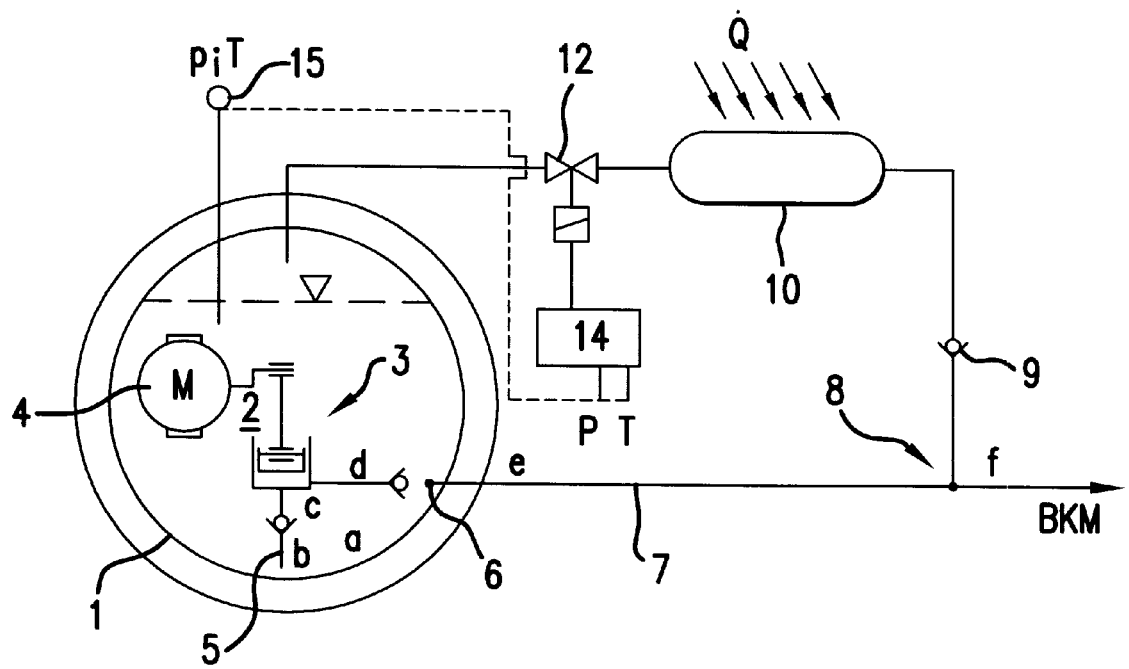
FIG. 1 is a schematic representation of a preferred embodiment of a system in accordance with the invention for selectively increasing the pressure in a fuel tank.

The system illustrated schematically in FIG. 1 encompasses a thermally-insulated cryo-tank 1, in which liquefied, cooled hydrogen is stored. In the system shown here, the fuel is cooled to a temperature of 24 K. A pressure of 4.5 bar is dominant inside the cryo-tank 1.

Located inside the cryo-tank 1 is a conveying device 2, here comprising a hydrostatic pump 3 and a drive device 4. The hydrostatic pump 3 includes an intake-side inlet region 5 for suctioning the fuel, and a pressure-side outlet region 6 for releasing the fuel under a release pressure that is higher than the tank pressure.

Here, the drive device 4 preferably includes an electric motor with windings that comprise a virtually superconducting material. The electric motor is disposed inside the tank such that it is cooled by the fuel itself. Voltage is supplied by way of insulated electrical conductors that lead into the tank 1.

A fuel line 7, by way of which the conveyed fuel travels to an injection system of an internal-combustion engine, is connected to the outlet region 6 of the pump 3.

The fuel line 7 is provided with a branch 8, by way of which a partial fuel flow can be diverted from the fuel line 7. The conveying pressure prevailing in the fuel line 7 conveys this partial fuel flow by way of a check-valve device 9 and into an evaporator 10. The diverted fuel is heated and evaporated in this evaporator 10. The pressure mounting due to the check-valve device 9 can temporarily be higher than the pressure level in the fuel line 7. It is possible to embody the evaporator 10 as a pressure chamber, so a larger quantity of gaseous fuel can be stored in the pressure chamber at a pressure level that is at least in the range of the fuel pressure in the fuel line 7. It is possible to expand the storage capacity additionally, for example with metal-hybrid structures.

A feed-valve arrangement 12 permits the controlled supply of the gaseous fuel that was formed in the evaporator 10 into the cryo-tank 1. This supply is preferably effected with a tank-pressure control device 14. The tank-pressure control device preferably processes signals that are representative of at least the tank pressure, and/or of the fuel temperature. These signals are preferably generated by multiple, redundant sensors 15, preferably with consideration of the fullness level.

Figure 2:
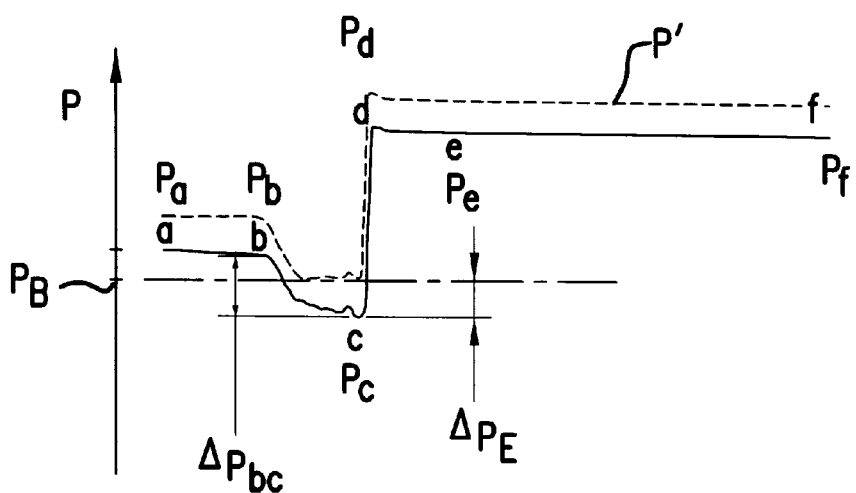
FIG. 2 is a diagram for explaining the static fuel pressure on a flow path from the fuel tank, through the conveying device, and into the fuel line.

FIG. 2 qualitatively illustrates the course of the static pressure on a flow path that links the points a, b, c, d, e, f from FIG. 1 together, and extends from the tank 1, through the pump 3 and into the fuel line 7.

A static pressure $P_a$ prevails at point a; this pressure corresponds to the static pressure in the tank 1, at the level of the pump inlet 5. As dictated by the fullness level, this pressure is higher than a fuel boiling pressure $p_b$, which is a function of the fuel temperature. A static pressure $p_b$ prevails directly at the intake opening of the pump inlet 5; depending on the flow speed of the fuel, this pressure is slightly lower than the pressure $p_a$. Inside the pump inlet 5, the pressure drops to a minimum pressure $p_e$, which is dominant behind a check valve during an intake phase. During a conveying phase, the pressure in the fuel that was previously conveyed via the check valve is increased to a pressure $p_d$. Here, a check valve disposed on the pump-outlet side opens, and the fuel enters the fuel line 7 under the static pressure $p_e$. The pressure only falls slightly, to a pressure $p_f$, along the fuel line 7. Depending on the design of the pump 3, the pressure $p_f$ can be at a high level, e.g., 15 bar. At the branch point 8, a fuel flow can be diverted to the evaporator 10. The fuel flows to the evaporator 10 as soon as a pressure that corresponds to the conveying pressure in the fuel line prevails in the evaporator. In this state, the check valve 9 returns to its blocking position. The fuel that has traveled into the evaporator and been evaporated there can be metered into the tank 1 via the feed-valve device 12.

A control strategy created with the control device 14 controls the feeding of the fuel. Here, the fullness level of the tank 1 and the pressure drop that occurs in the intake region, as dictated by the design of the pump 3, can be taken into consideration. If, for example, an evaluation of the tank-pressure signals, the fuel-temperature signals and the tank-fullness status reveals that static pressures lower than the boiling pressure are expected to occur in the fuel during pump operation, the feed device can effect a pressure increase in the tank 1 by a differential-pressure amount $\Delta p_E$, with $\Delta p_E$ corresponding to at least the difference between the boiling pressure and the minimum pressure on the flow path (here, pc). Consequently, the pressure course along the flow path is raised to a level indicated by the dashed line p' in FIG. 2.

The inventive solution is not only suitable for hydrogen, but also for other low-boiling fuels, particularly hydrocarbon compounds. The apparatus according to the invention can also be used to convey the fuel to, for example, a fuel cell.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for conveying a cryogenically-stored fuel in the liquid state, the method comprising:
   conveying the cryogenic fuel from a thermally-insulated fuel tank into a fuel line using a conveying device;
   sensing fuel temperature using a temperature sensor; and
   increasing pressure in the fuel tank using a tank pressure control device by an amount $\Delta P_E$ that is larger than the difference between a drop $\Delta p_{bc}$ in the supply-flow pressure occurring on the intake side of the conveying device and the difference between the tank pressure $p_b$ at a pump-inlet point and the boiling pressure $P_B$ as a function of the sensed fuel temperature.

2. The method according to claim 21, wherein the act of increasing the pressure in the fuel tank includes the act of increasing the pressure in the fuel tank to a level that is higher than the sum of the boiling pressure as a function of the fuel temperature and the maximum intake-side pressure drop at the conveying device.

3. The method according to claim 1, further including increasing the pressure in the fuel tank by supplying gaseous fuel into the fuel tank.

4. The method according to claim 3, furthering comprising diverting the gaseous fuel fed into the fuel tank from a pressurized tank.

5. The method according to claim, 3, furthering comprising diverting the gaseous fuel fed into the fuel tank from a site located downstream of the conveying device, and then heating and evaporating the diverted fuel before feeding it into the fuel tank.

6. The method according to claim 5, further comprising drawing the heat supplied to the diverted fuel from the environment.

7. The method according to claim 1, further comprising driving the conveying device by a motor that is disposed in the fuel tank and cooled by the fuel.

8. The method according to claim 1, wherein the act of conveying the cryogenic fuel includes the act of conveying the cryogenic fuel at a pressure level in the range of a combustion-chamber intake pressure.

9. The method according to claim 1, further comprising shutting off the conveying device, and then reducing the pressure in the tank to the boiling pressure as a function of the fuel temperature.

10. The method according to claim 1, wherein, after the conveying device is shut off, the fuel is cooled through controlled evaporation.

11. The method according to claim 1, further comprising supplying the fuel that has been evaporated in a controlled manner to a secondary consumer, particularly a fuel cell, a an auxiliary heating device or an APU.

12. An apparatus for conveying a cryogenically-stored fuel in the liquid state to an internal-combustion engine, the apparatus comprising:

a thermally-insulated fuel tank for storing the fuel;

a conveying device connected to the fuel tank for conveying the fuel into a fuel line;

a temperature sensor for sensing fuel temperature; and a tank pressure control device connected to the fuel tank and the fuel line and receiving signal from the sensor, the tank pressure control device increasing the pressure in the fuel tank by an amount that is larger than the difference between a drop in the supply-flow pressure occurring on the intake side of the conveying device and the difference between the dominant tank pressure at a pump-inlet point and the boiling pressure as a function of the fuel temperature sensed by the temperature sensor.

13. The apparatus according to claim 12, wherein the tank pressure control device includes a fuel container for storing the fuel in the gaseous state at a pressure level that is higher than the tank pressure.

14. The apparatus according to claim 12, further comprising a valve device for controlling the supply of the gaseous fuel into the fuel tank.

15. The apparatus according to claim 12, further comprising an evaporator device for supplying heat to a partial fuel flow that has been diverted from the fuel line.

16. The apparatus according to claim 12, further comprising a check-valve device in front of the evaporator device for preventing a reflux into the fuel line.

17. The apparatus according to claim 12, wherein the conveying device includes a piston pump.

18. The apparatus according to claim 12, wherein the conveying device includes a gear pump.

19. The apparatus according to claim 12, wherein the conveying device is disposed in the fuel tank.

20. The apparatus according to claim 12, wherein the conveying device includes an electric motor, which comprises a superconducting motor winding.

* * * * *